(12) United States Patent
Seo et al.

(10) Patent No.: US 8,557,214 B2
(45) Date of Patent: Oct. 15, 2013

(54) POROUS METAL OXIDE PARTICLES

(75) Inventors: Dong-Kyun Seo, Chandler, AZ (US);
Danielle Ladd, Westminster, CO (US);
Alex Volosin, Tempe, AZ (US)

(73) Assignee: Arizona Board of Regents, a body corporate of the State of Arizona, Scottsdale, AZ (US)

( * ) Notice: Subject to any disclaimer, the term of this patent is extended or adjusted under 35 U.S.C. 154(b) by 157 days.

(21) Appl. No.: 12/992,678

(22) PCT Filed: Apr. 21, 2009

(86) PCT No.: PCT/US2009/041286
§ 371 (c)(1),
(2), (4) Date: Dec. 15, 2010

(87) PCT Pub. No.: WO2009/140030
PCT Pub. Date: Nov. 19, 2009

(65) Prior Publication Data
US 2011/0092363 A1    Apr. 21, 2011

Related U.S. Application Data

(60) Provisional application No. 61/053,588, filed on May 15, 2008.

(51) Int. Cl.
*C01B 13/14*    (2006.01)
(52) U.S. Cl.
USPC .................. 423/592.1; 997/776; 423/628
(58) Field of Classification Search
USPC .......................................... 502/412; 423/628
See application file for complete search history.

(56) References Cited

U.S. PATENT DOCUMENTS

| | | | |
|---|---|---|---|
| 5,680,713 | A | 10/1997 | Forbert et al. |
| 6,131,305 | A | 10/2000 | Forbert et al. |
| 6,893,564 | B2 | 5/2005 | Mueller et al. |
| 2008/0090716 | A1 | 4/2008 | Cherepy et al. |

FOREIGN PATENT DOCUMENTS

| | | |
|---|---|---|
| EP | 454239 | 10/1991 |
| EP | 497466 | 8/1995 |
| EP | 1230008 | 8/2002 |
| WO | WO 99/32218 | 7/1999 |
| WO | WO0128675 | 4/2001 |
| WO | WO2009140030 | 11/2009 |

OTHER PUBLICATIONS

Laine et al. "Making Nanosized Oxide Powders From Precursors by Flame Spray Pyrolysis". Key Engr Matl. 159-160 pp. 17-24. 1999.*

(Continued)

*Primary Examiner* — Stanley Silverman
*Assistant Examiner* — Richard M Rump
(74) *Attorney, Agent, or Firm* — Fish & Richardson P.C.

(57) ABSTRACT

Preparing porous particles includes forming a gel including a first liquid and an oxygen-containing compound of a metal, semi-metal, metalloid, or semi-conductor, including an oxide, hydroxide, alkoxide, oxohydroxide, oxoalkoxide, oxo salt, or oxo salt hydrate of the metal, semi-metal, metalloid, or semi-conductor; contacting the gel with a combustible liquid to form a combustible gel; and initiating combustion of the combustible gel to form a substance including porous metal, semi-metal, metalloid, or semi-conductor oxide particles. The combustible liquid can include a volatile solvent. The porous particles have open pores with a range of nanoscale pore sizes. The porous particles may be treated further to form, for example, a composite.

18 Claims, 9 Drawing Sheets

(56) References Cited

OTHER PUBLICATIONS

Schuyten et al. "A Novel Combustion Synthesis Preparation of CuO/ZnO/ZrO2/Pd for Oxidative Hydrogen Production from Methanol" Catal Lett (2008) 121:189-198.*

T. Mahata, G. Das, R.K. Mishra, B.P. Sharma, Combustion synthesis of gadolinia doped ceria powder, Journal of Alloys and Compounds, vol. 391, Issues 1-2, Apr. 5, 2005, pp. 129-135, ISSN 0925-8388, 10.1016/j.jallcom.2004.07.085. (http://www.sciencedirect.com/science/article/pii/S0925838804011806).*

Nedelec, J.M., "Sol-Gel Processing of Nanostructured Inorganic Scintillating Materials", Journal of Nanomaterials, vol. 2007, Article ID 36392, 8 pages.

Sivashanmugam, A. et al., "Glycine-Assisted Sol-Gel Combustion Synthesis and Characterization of Aluminum-Doped LiNiVO4 for Use in Lithium-Ion Batteries", Journal of The Electrochemical Society, vol. 153, No. 3, A497-A503, 2006.

Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.

PCT/US2009/041286, Written Opinion and International Search Report mailed Dec. 16, 2009, 7 pages.

Rolison, D. R. et al., "Electrically conductive oxide aerogels: new materials in electrochemistry", Journal of Materials Chemistry, vol. 11, pp. 963-980, 2001.

Zhang, Zhaorong et al., "Mesostructured Forms of gamma-Al2O3", Journal of American Chemical Society, vol. 124, No. 8, pp. 1592-1593, 2002.

Baumann, Theodore F. et al., "Synthesis of High-Surface-Area Alumina Aerogels without the Use of Alkoxide Precursors", Chem. Mater., vol. 17, No. 2, pp. 395-401, 2005.

Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.

Kwak, Ja Hun et al., "Penta-coordinated Al3+ ions as preferential nucleation sites for BaO on γ-Al2O3: An ultra-high-magnetic field 27Al MAS NMR study", Journal of Catalysis, vol. 251, pp. 189-194, 2007.

Boettcher, Shannon W. et al., "Harnessing the Sol—Gel Process for the Assembly of Non-Silicate Mesostructured Oxide Materials", Accounts of Chemical Research, vol. 40, No. 9, pp. 784-792, 2007.

Zürner, Andreas et al., "Visualizing single-molecule diffusion in mesoporous materials", Nature, vol. 450, pp. 705-709, Nov. 29, 2007.

Iancu, Nora et al.,"Low-temperature synthetic method for size-controlled CdSe nanocrystals: utilization of boron selenide", Chem. Commun., pp. 2298-2299, 2004.

Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.

Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.

Villemin, Didier et al., "A one step process for grafting organic pendants on alumina via the reaction of alumina and phosphonate under microwave irradiation", Chem. Commun., pp. 2060-2061, 2001.

* cited by examiner

POROUS METAL OXIDE PARTICLES

CROSS-REFERENCE TO RELATED APPLICATION

This application claims priority to U.S. Provisional Patent Application Ser. No. 61/053,588 filed May 15, 2008, which is incorporated by reference herein in its entirety.

BACKGROUND

This document relates to porous metal oxide particles and composites made from gels.

Porous metal oxide particles have been produced by extracting the liquid component of certain gels through methods such as supercritical carbon dioxide drying, freeze-drying, and the use of a spring-back effect during the ambient drying of surface-modified gels. These methods allow liquid in the gel to be removed without causing the solid matrix in the gel to collapse. Porous metal oxide particles have also been prepared by the use of organic templates which are removed by calcination or dissolution. These methods can be costly, time-consuming, environmentally hazardous, or limited to certain metal oxides, such as silica. Some drying methods result in fragile porous materials with limited application.

SUMMARY

In one aspect, preparing porous particles includes forming a gel that includes a first liquid and a metal oxide, contacting the gel with a combustible liquid to form a combustible gel, and initiating combustion of the combustible gel to form a substance including porous particles.

In another aspect, preparing porous metal oxide, semi-metal oxide, metalloid oxide, or semi-conductor oxide particles includes contacting a gel including a first liquid and an oxygen-containing compound of a metal, semi-metal, metalloid, or semi-conductor with a combustible liquid to form a combustible gel, and initiating combustion of the combustible gel to form a substance including porous metal oxide, semi-metal oxide, metalloid oxide, or semi-conductor oxide particles. One implementation includes forming the gel before contacting the gel with the combustible liquid.

In some implementations, the substance formed by combustion of the combustible gel may be treated to change the chemical structure or composition of the substance. Another aspect includes the substance formed by combustion of the combustible gel.

In another aspect, removing liquid from a gel includes soaking a gel that includes a first liquid and metal oxide in a combustible liquid to form a combustible gel, and initiating combustion of the combustible gel to remove liquid from the gel.

In another aspect, removing liquid from a gel includes soaking a gel that includes a first liquid and an oxygen-containing compound of a metal, semi-metal, metalloid, or semi-conductor in a combustible liquid to form a combustible gel, and initiating combustion of the combustible gel to remove liquid from the gel.

Implementations may include one or more of the following features. The oxygen-containing compound can be an oxide, hydroxide, alkoxide, oxohydroxide, oxoalkoxide, oxo salt, or oxo salt hydrate of a metal, semi-metal, metalloid, or semi-conductor. In some implementations, the gel can be formed in a sol-gel process. In still other implementations, the gel can be formed by precipitation from a solution.

Contacting the gel with the combustible liquid can include soaking the gel in the combustible liquid. The combustible liquid may be more viscous than the first liquid at room temperature. In some cases, the temperature of the combustible liquid during soaking is less than the autoignition temperature of the combustible liquid. The combustible gel may be heated, for example, to evaporate a portion of the combustible liquid before initiating combustion.

The combustible liquid can include an oil or a liquid or solid derived from an oil. In some implementations, the combustible liquid includes a volatile solvent. The volatile solvent may be, for example, tetrahydrofuran, dimethyl sulfoxide, or ethanol. The oil can be from a geological source (e.g., a petroleum source), an agricultural or aquacultural source (e.g., castor oil, vegetable oil, algae oil, etc.), an industrial waste or by-product (e.g., waste vegetable oil, waste engine oil, animal fat, grease, etc), or a household waste (e.g., waste vegetable oil, etc.). Using an agriculturally or aquaculturally derived oil or waste oil can be cost-effective and reduces ecological impact of the process. Additionally, the process of heating the porous particles during formation may result in robust, porous particles able to withstand capillary pressure when mixed with liquid.

In some implementations, initiating combustion includes heating the combustible gel above the autoignition temperature of the combustible liquid in the presence of oxygen. In certain implementations, an amount of oxygen present during heating can be controlled. In certain implementations, an amount of heat provided to the combustible gel can be controlled. Controlling the amount of heat or oxygen present during heating allows the extent of combustion to be controlled. For example, increasing an amount of oxygen present can facilitate complete combustion.

In some implementations, the gel is contacted with a second liquid before the gel is contacted with the combustible liquid. The second liquid can be a solvent. The combustible liquid may be more viscous than the second liquid at room temperature. The second liquid may be, for example, dimethyl sulfoxide, tetrahydrofuran, or ethanol. Contacting the gel with a second liquid allows some of the second liquid to replace some of the first liquid in the gel. In some cases, the boiling point of the combustible liquid exceeds the boiling point of the first liquid, the second liquid, or both the first and the second liquid. In some implementations, the combustible liquid may be formed by reaction of a fluid (a gas or a liquid) with the first liquid, the second liquid, or both the first and the second liquids (e.g., when the gel with the first or second liquid contacts or is exposed to the fluid).

In some implementations, the porous particles include alumina, silica, titania, zirconia, yttria-stabilized zirconia, niobium oxide, tantalum oxide, or any combination thereof. In some cases, the particles are nanoporous, with a mean pore width (diameter) up to about 100 nm. In certain implementations, the substance formed by initiating combustion of the combustible gel includes carbon. The substance can be treated to remove carbon from the substance.

In certain implementations, the porous particles are contacted with an additive to form a composite including the porous particles and the additive. In some cases, the additive binds to the porous particles. The composite can be treated further. In some cases, treating the composite includes heating the composite. Some implementations include contacting the composite with a solvent to etch the composite. In some cases, the porous particles or the composite may be used as a reactant or a component to form a new material.

DETAILED DESCRIPTION

This document describes examples of methods for preparing porous oxides of metals, semi-metals, metalloids, and semi-conductors ("porous particles"). As used herein, "metal" generally refers to a metal, semi-metal, metalloid, or semi-conductor.

Figure 1:
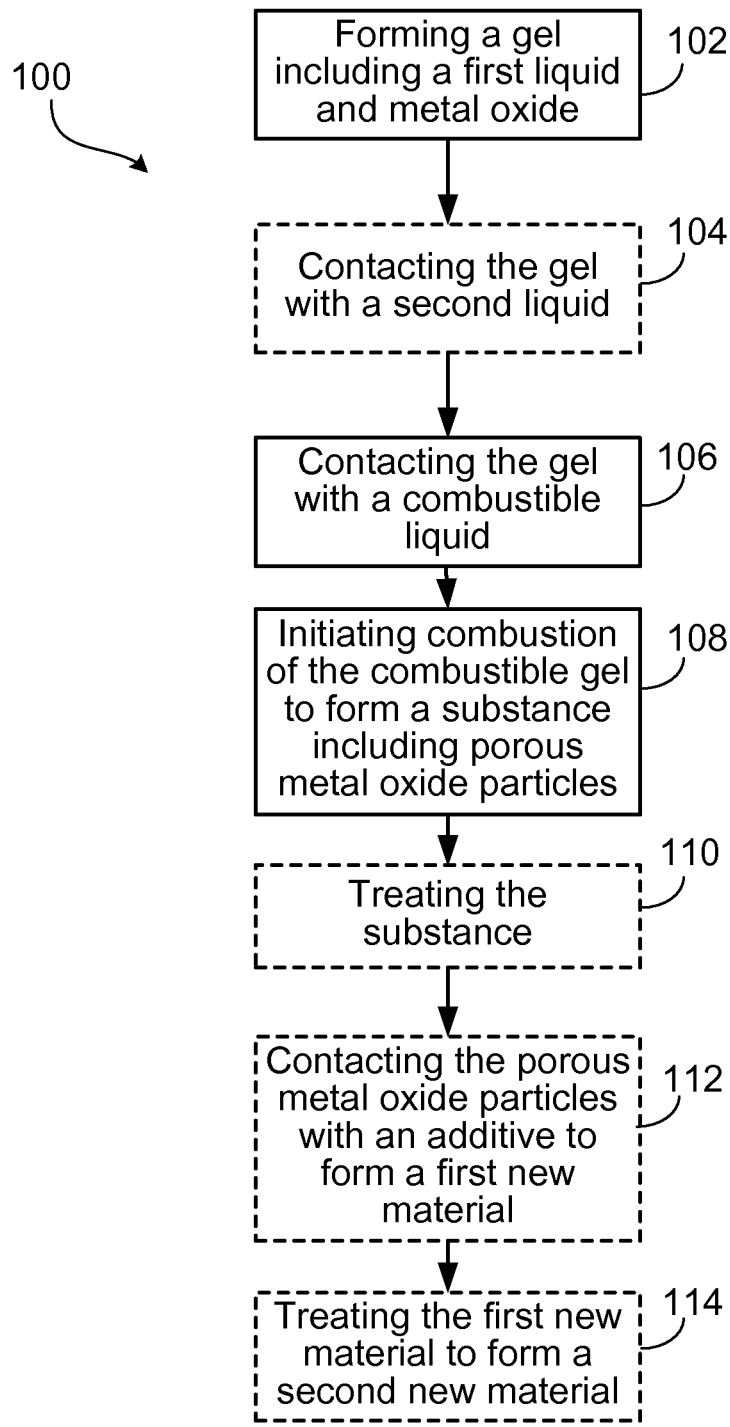
FIG. 1 is a flow chart that depicts an exemplary method for forming porous particles.

Referring to FIG. 1, a process for preparing porous particles 100 can include forming a gel 102. The gel can be a gel formed, for example, by a sol-gel process. Examples of gel formation are described by C. Jeffrey Brinker and George W. Scherer in their book "Sol-Gel Science: The Physics and Chemistry of Sol-Gel Processing" and by Baumann et al. in "Synthesis of High-surface-Area Alumina Aerogels without the Use of Alkoxide Precursors," *Chemistry of Materials* 2005, 17, 395-401, both of which are incorporated by reference herein in their entirety. In some cases, a gel can be obtained by precipitation from a solution.

Gels formed in step 102 include a first liquid and metal oxide. In some cases the liquid can be a mixture of two or more liquids, such as water and an alcohol (e.g., ethanol). In some cases, the gel can include pre-formed substances, such as organic polymers, gold nanoparticles, other metal oxide nanoparticles, silica beads, and polystyrene beads. In certain cases, the gel includes organic polymers that are formed during the gelation. The metal oxide can be formed from one or more inorganic salts, organometallic compounds, or alkoxides of metals, semi-metals, metalloids, and semi-conductors including Li, Na, K, Rb, Cs, Be, Mg, Ca, Sr, Ba, B, Al, Ga, In, Si, Ge, Sn, Pb, P, As, Sb, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Sc, Y, Lu, La, Ce, Pr, Nd, Sm, Eu, Gd, Tb, Dy, Ho, Er, Tm, Yb, Th, U, Tl, Pb, Bi, or any combination thereof. Exemplary inorganic salts include aluminum chloride hexahydrate, aluminum nitrate nonahydrate and aluminum hydroxide (gibbsite). Exemplary metal alkoxides include aluminum isopropoxide and aluminum isobutoxide. The metal oxide can also be formed from a partially hydrolyzed form of any of the aforementioned organometallic compounds or metal alkoxides, such as siloxanes and aluminoxanes.

In some cases, the metal oxide includes transition metal oxides, rare earth metal oxides, mineral oxides, ceramic oxides, or any combination thereof. Exemplary oxides include alumina, silica, titania, zirconia, yttria-stabilized zirconia, niobium oxide, and tantalum oxide.

In some implementations of process 100, the gel formed in step 102 is contacted with a second liquid in optional step 104. The second liquid can be, for example, tetrahydrofuran (THF), dimethyl sulfoxide (DMSO) or ethanol. In some cases, the second liquid is a mixture of two or more liquids. In some cases, the gel can be contacted with a second liquid and then sequentially with one or more additional liquids in a multi-step soaking procedure. Contacting the gel formed in step 102 with the second liquid allows the second liquid to replace some of the first liquid in the gel. Contacting the gel with the second liquid can include soaking the gel in the second liquid by, for example, placing the gel in the second liquid such that some or all of the gel is in contact with the second liquid. In other implementations, the gel can be immersed in the second liquid to allow at least some exchange of the first and second liquids. In still other implementations, the combustible liquid may be formed by reaction of a fluid (a gas or a liquid) with the first liquid, the second liquid or both the first and the second liquids, when the gel is exposed to the fluid.

Step 106 includes contacting the gel with a combustible liquid to form a combustible gel. The combustible liquid can be at a temperature below the autoignition temperature of the combustible liquid. In some cases, the boiling point of the combustible liquid exceeds the boiling point of the first liquid, the second liquid, or both. The combustible liquid can be, for example, an oil or a combination of two or more oils. The oil can be derived from sources including geological, agricultural, and aquacultural sources. Oils derived from geological sources include petroleum-based oils and synthetic oils. Oils derived from agricultural or aquacultural sources include algae-based oils and plant-based oils such as castor oil, corn oil, peanut oil, canola oil, and vegetable oils. In some cases, the oil is modified to form a combustible liquid derived from the oil. For example, a naturally occurring oil can be modified to alter saturation or functionalization of the oil.

Contacting the gel formed with the combustible liquid allows the combustible liquid to replace some of the first liquid or second liquid in the gel. Contacting the gel with the combustible liquid can include soaking the gel in the combustible liquid by, for example, placing the gel in the combustible liquid such that some or all of the gel is in contact with the combustible liquid. In other implementations, the gel can be immersed in the combustible liquid. In still other implementations, the combustible liquid may be formed by reaction of a fluid (a gas or a liquid) with the first liquid, the second liquid or both the first and the second liquids, when the gel is exposed to the fluid.

Step 108 includes initiating combustion of the combustible gel. Initiating combustion can include, for example, heating the combustible gel at or above the autoignition temperature of the combustible liquid. During combustion, liquid in the gel is substantially removed from the gel to form a substance including porous particles. As used herein, "substance" and "material" refers to physical matter that may be homogeneous or inhomogeneous, and are not limited to any particular structure or chemical composition. In some cases, the porous particles are mesoporous. That is, mean pore width (diameter) in the particles can range from about 2 nm to about 50 nm. In other cases, pores in the particles can be less than 2 nm in mean width (diameter) (i.e., microporous), or greater than 50 nm in mean width (diameter) (i.e., macroporous). Micropores allow slow molecular flow and have high surface area. Mesopores allow relatively easy molecular flow and have relatively high surface area. Macropores allow easy molecular flow and have a low surface area. In some cases, the particles are nanoporous, with a mean pore width (diameter) up to about 100 nm. A particle with a range of pore sizes offers the advantages of larger pores (e.g., efficient flow of fluid through the particle) as well as the advantages of smaller pores (e.g., higher surface area of the particle).

Combustion of the combustible gel may be complete or incomplete. In some cases, complete combustion yields a substantially pure inorganic oxide. Incomplete combustion can yield a substance including an inorganic oxide and carbon. The carbon can be in the form of one or more carbon-containing substances. The combustible liquid can be chosen to be environmentally friendly. For example, the combustible liquid can be a biofuel, such that burning off the combustible liquid is substantially greenhouse neutral.

Removing the liquid from a gel by combustion allows heat treating of the porous particles during liquid removal. Heat treating the porous particles may yield a material that is structurally robust, and thus able to withstand capillary forces resulting from contacting the porous particles with liquid. Additionally, the heat-treated porous particles may be able to withstand high temperatures (e.g., 1000° C. for alumina) without incurring substantial damage to the structure or function of the porous material. For example, subsequent heating of the heat-treated porous particles may not substantially alter the density or the hardness of the material.

The porous particles resulting from step 108 can be, for example, porous alumina, with a surface area of about 300 $m^2/g$, an accumulated pore volume of about 2 cc/g (from pores less than 125 nm), and an adsorption average pore diameter and adsorption average pore width (maximum diagonal length) between 25 and 30 nm. The particles are stable up to at least 1000° C.

Optional step 110 includes processing the product of step 108, for example, to remove impurities. In an example, a gel that undergoes incomplete combustion in step 108 can yield a substance including porous particles as well as carbon-containing material. The substance can be further heated in step 110 to burn off the carbon-containing material. Step 110 may include other processes to enhance the purity of the porous particles. In other implementations, the heating allows the porous particles to react with the impurities to form another substance.

Optional step 112 includes contacting the porous particles with an additive to form a composite or a first new material including the porous particles and the additive. In some cases, the additive binds to the porous particles to form the first new material. The additive can be any material with dimensions, for example, that allow incorporation of the additive into the pores of the porous particles. In some cases, the additive is an organic, inorganic, organometallic, polymeric, or biological substance, including fibers, carbon nanotubes, nanoparticles, etc. Examples of contacting include depositing the additive in the pores of the porous particles, impregnating the porous particles with the additive, grafting the additive to the porous particles, and adsorbing the additive onto the porous particles.

Optional step 114 includes treating the composite or material formed in step 112 to form a second new material. The second new material can be a composite or a reaction product of the material or composite formed in step 112. Treating the composite or material formed in step 112 can include heating to form a reaction product of the additive through, for example, pyrolysis, calcination, or sintering. In some cases, treating the composite or material formed in step 112 includes co-synthesizing, or providing one or more reactants to react with the additive and to form a reaction product of the additive. Like the porous particles formed in step 108, materials formed in steps 112 and 114 are able to absorb a substantial quantity of liquid, such as water and acetone. Similarly, the porous particles of steps 108, 112, and 114 can function as scaffolds or containers for a variety of substances of varying sizes.

In some cases, porous particles can be used as a template to form another porous material. For example, porous particles can be impregnated with an additive in step 112 to form a composite. The composite can be etched with an acid or a base by immersing the composite in an acidic or basic solution for a length of time to remove the porous particles, leaving a scaffold of the impregnated additive.

Figure 2:
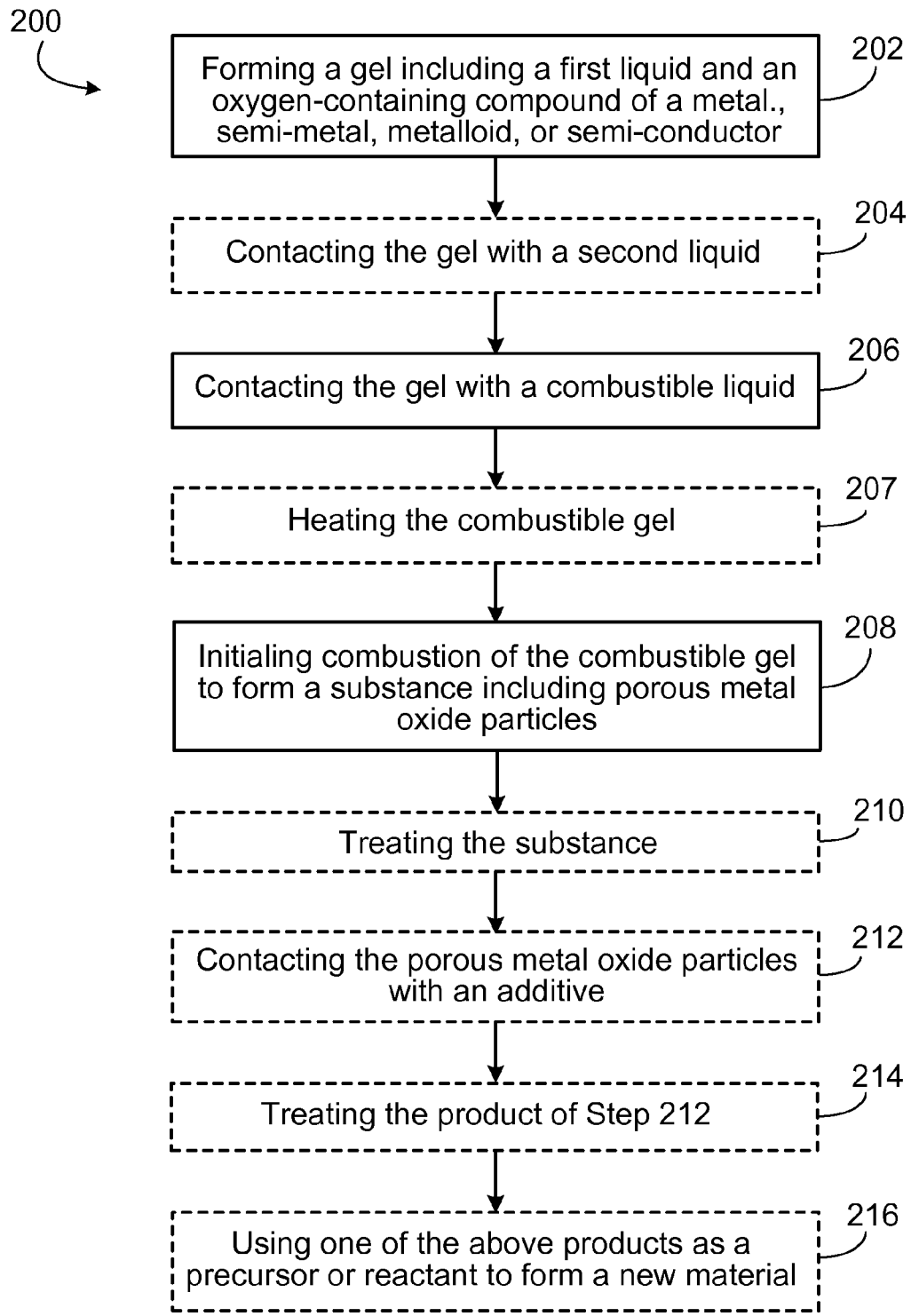
FIG. 2 is a flow chart that depicts an exemplary method for forming porous metal oxide, semi-metal oxide, metalloid oxide, or semi-conductor oxide particles.

Referring to FIG. 2, a process for preparing porous oxides of metals, semi-metals, metalloids, and semi-conductors 200 can include forming a gel 202. The gel can be a gel formed, for example, by a sol-gel process. The gel can be obtained by precipitation from a solution. Gels formed in step 202 include a first liquid and an oxygen-containing metal, semi-metal, metalloid, or semi-conductor. The oxygen-containing compound can be an oxide, hydroxide, alkoxide, oxohydroxide, oxoalkoxide, oxo salt, or oxo salt hydrate of a metal, semi-metal, metalloid, or semi-conductor. This compound may be formed from one or more inorganic salts or inorganic or organometallic compounds of Li, Na, K, Rb, Cs, Be, Mg, Ca, Sr, Ba, B, Al, Ga, In, Si, Ge, Sn, Pb, P, As, Sb, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Sc, Y, Lu, La, Ce, Pr, Nd, Sm, Eu, Gd, Tb, Dy, Ho, Er, Tm, Yb, Th, U, Tl, Pb, Bi, or any combination thereof. In some cases, the metal, semi-metal, metalloid, or semi-conductor oxide includes transition metal oxides, rare earth metal oxides, mineral oxides, ceramic oxides, or any combination thereof. Exemplary oxides include alumina, silica, titania, zirconia, niobium oxide, and tantalum oxide. Exemplary inorganic salts include aluminum chloride hexahydrate, aluminum nitrate nonahydrate, and aluminum hydroxide (gibbsite). Exemplary metal alkoxides include aluminum isopropoxide and aluminum isobutoxide. The metal, semi-metal, metalloid, or semi-conductor oxide can also be formed from a partially hydrolyzed form of any of the aforementioned organometallic compounds or alkoxides, such as siloxanes and aluminoxanes.

The liquid used in forming the gel can be a mixture of two or more liquids, such as water and an alcohol (e.g., ethanol, isopropanol, and the like). In some cases, the gel can include pre-formed substances, such as organic polymers, gold nanoparticles, other metal oxide nanoparticles, silica beads, and polystyrene beads. In certain cases, the gel includes organic polymers that are formed during gel formation.

In some implementations of process 200, the gel formed in step 202 is contacted with a second liquid in optional step 204. The second liquid can be, for example, THF, DMSO, or ethanol. In some cases, the second liquid is a mixture of two or more liquids. In some cases, the gel can be contacted with a second liquid and then sequentially with one or more additional liquids in a multi-step soaking procedure. Contacting the gel formed in step 202 with the second liquid in step 204 allows the second liquid to replace some of the first liquid in the gel. Contacting the gel with the second liquid can include soaking the gel in the second liquid by, for example, placing the gel in the second liquid such that some or all of the gel is in contact with the second liquid. In other implementations, the gel can be immersed in the second liquid. In still other implementations, the combustible liquid may be formed by reaction of a fluid (a gas or a liquid) with the first liquid, the second liquid or both the first and the second liquids, when the gel is exposed to the fluid.

In some embodiments, the first liquid or the second liquid may be heated (e.g., before or during contacting the gel with the combustible liquid). Heating one of the liquids may facilitate more thorough mixing of the liquid. Heating above a certain temperature will promote evaporation of one of the liquids (e.g., the first or second liquid), such that another liquid (e.g., the second or combustible liquid) more readily fills voids created by the evaporation. In some embodiments, step 204 may facilitate removal of impurities or selected components (e.g., by-products formed during the sol-gel process) from the gel.

Step 206 includes contacting the gel with a combustible liquid to form a combustible gel. In some cases, the combustible liquid may react with the first liquid, the second liquid, or both to give a different combustible liquid in forming a combustible gel. The combustible liquid can be at a temperature below the autoignition temperature of the combustible liquid. In some cases, the boiling point of the combustible liquid exceeds the boiling point of the first liquid, the second liquid, or both. The combustible liquid may have a viscosity that exceeds the viscosity of the first liquid at room temperature. The combustible liquid can include, for example, one or more oils, one or more combustible solid or liquid compounds derived from an oil, one or more volatile solvents, or any combination thereof. The combustible liquid may be a solid at room temperature, such that contacting the gel with the combustible liquid occurs at a temperature above room temperature. Use of a volatile solvent speeds up infiltration of the gel with the oil or combustible compounds by reducing the viscosity of the oil or oil derivative. In some cases, a volatile solvent may be used to dissolve a solid oil or solid compound derived from an oil to allow infiltration of a gel with the oil or oil derivative. Use of a volatile solvent also reduces the amount of oil required in step 206.

The oil can be derived from sources including geological, agricultural, and aquacultural sources. The oil may be a household waste product, or an industrial waste product or by-product. Oils derived from geological sources include petroleum-based oils and synthetic oils. Oils derived from agricultural or aquacultural sources include algae-based oils and plant-based oils such as castor oil, corn oil, peanut oil, canola oil, cottonseed oil and vegetable oils, including waste vegetable oils previously used for cooking. Oils from industrial wastes or by-products, or household wastes include waste vegetable oil, yellow grease, animal fat and waste engine oil. In some cases, the combustible oil may include a precursor compound of the porous particles. For example, the combustible oil may include a small amount of a copper complex compound. When the oil combusts in an alumina gel, the porous oxide product is formed with copper atoms in the alumina pore wall. In another example, the combustible oil includes silicon oil (poly-dimethyl siloxane). After the combustion in an alumina gel, the product includes silicon-doped porous alumina.

The oil may be a liquid or a solid at room temperature. Examples of oils that are solid at room temperature include paraffin and animal fats. In some cases, a naturally occurring oil can be modified to alter saturation or functionalization of the oil. Combustible compounds derived from an oil include liquids as well as solids. A combustible liquid derived from an oil may be more viscous than the oil from which it is derived. A combustible compound derived from an oil may include oligomers or telomers of the oil.

Volatile solvents that may be used in the combustible liquid include, for example, THF and DMSO, and other oil-miscible solvents. The volatile solvent may be mixed in any ratio with the oil(s) or compound(s) derived from the oil(s). In an example, an oil:THF volume ratio in a combustible liquid may be from about 10:90 to about 20:80. The volatile solvent may become miscible with the oil or dissolve the solid oil above room temperature. The volatile solvent can be evaporated before the combustion of the gel, leaving the oil in the gel. The evaporation can be promoted by methods including heating, evacuation, and the like. The reduction of the overall volume of the liquid in the gel pores may induce shrinkage of the gel, yielding a denser gel. In this way, the oil:solvent volume ratio may be selected to control the porosity and pore structure of the resulting porous particle.

Contacting the gel with the combustible liquid allows the combustible liquid to replace some of the first liquid, second liquid or both the first and the second liquids in the gel. Contacting the gel with the combustible liquid can include soaking the gel in the combustible liquid by, for example, placing the gel in the combustible liquid such that some or all of the gel is in contact with the combustible liquid. In other implementations, the gel can be immersed in the combustible liquid.

In steps 204 and 206, mixing may be promoted by methods including ultrasonic cavitation, ultrasonic agitation, mechanical agitation, shear, stirring, shaking, vibration, and the like.

Optional step 207 includes heating the product of step 206 above the boiling point of the volatile solvent to substantially remove the solvent from the combustible gel, such that the oil or oil derivative remains in the pores of the metal compound. For example, when THF is used as the volatile solvent, the gel from step 206 may be heated at about 80° C. to substantially remove THF from the combustible gel. As the THF evaporates, the gel shrinks, and an oil-filled gel results. Evacuation may be applied during the heating to remove the evaporated solvent more effectively and promote the evaporation. Step 207 may include two or more heating steps (e.g., at two or more different temperatures.). For example, optional step 207 may also include thermal or short-chain polymerization of the oil in an oil-filled gel. Polymerization of the oil may be achieved, for example, by heating the oil-filled or oil-soaked gel (e.g., at about 300° C.) in a closed environment, increasing the viscosity of the oil or forming a solid from the oil. More viscous oils tend to have a higher boiling point and a lower vapor pressure upon heating. This reduces the loss of the oil during the combustion and hence may provide a higher porosity to the product.

Step 208 includes initiating combustion of the gel from step 207. Initiating combustion can include, for example, heating the combustible gel at or above the autoignition temperature of the combustible liquid or oil derivative. During combustion, liquid in the gel is substantially removed from the gel to form a substance including porous particles. In some cases, the porous particles are mesoporous. That is, mean pore width (diameter) in the porous particles can range from about 2 nm to about 50 nm. In other cases, the porous particles are nanoporous. That is, the pores have a mean width (diameter) of up to about 100 nm. In still other cases, pores in the porous particles can be less than 2 nm, greater than 50 nm, or any combination thereof. That is, a porous particle may include pore sizes ranging from less than 2 nm to over 50 nm or over 100 nm in, for example, a bimodal or trimodal distribution. The pores may be open pores, allowing fluid flow through the particles. A larger oil:solvent ratio in step 206 may yield porous particles with larger pore sizes.

Combustion of the combustible gel may be complete or incomplete. In some cases, complete combustion yields a substantially pure oxide of a metal, semi-metal, metalloid, or semi-conductor. Incomplete combustion can yield a substance including carbon. The carbon can be in the form of one or more carbon-containing substances. The combustible liquid can be chosen to be environmentally friendly. For example, the combustible liquid can be a biofuel, such that burning off the combustible liquid is substantially greenhouse neutral. In some embodiments, the combustible liquid includes an additional component that promotes carbon formation or combustion. For example, sugar or furfuryl alcohol provides carbon upon heating. Organic peroxides can be included in the combustible liquid as an internal oxygen source for the combustion. In some cases, the combustible liquid may include another component that may react with carbon upon oxygen-deprived heating. For example, a titanium complex compound can react with carbon to form titanium carbides in the porous particles.

Removing the liquid from a gel by combustion allows heat treating of the oxide during liquid removal, as described with respect to FIG. 1. The resulting surface area, accumulated pore volume, adsorption average pore diameter, and adsorption average pore width of the particles are similar to those described with respect to step 108 of FIG. 1.

The porous particles can further undergo any combination of steps 210-216. Optional steps 210, 212, and 214 are similar to the corresponding steps as described with respect to FIG. 1. For example, the γ-alumina resulting from step 208 can react with organic phosphonates to yield modified surfaces (Villemin et al. "A one step process for grafting organic pendants on alumina via the reaction of alumina and phosphonate under microwave irradiation," *Chemical Communications* 2001, 2060-2061).

In some examples, the porous particles can be doped with materials including, for example, silicon, neodymium, and the like. The porous particles can be impregnated with intermetallics, Na/K alloys, manganese oxides, and the like. The porous particles may allow sorption of quantum dots, proteins, and other substances. The pores may be used as a reaction site for chemical reactions. In some cases, nanoparticles can be synthesized in the pores.

The porous particles, composites, and materials described above can be used as a precursor or reactant in optional step 216 to make one or more new materials. In some cases, the porous particles can be mixed with other materials and subsequently treated mechanically, thermally or chemically to form composites that exhibit microscopically heterogeneous structures and have new or enhanced functionalities. For example, porous yttria-stabilized-zirconia can be mixed and thermally treated with nickel oxide to form a composite for fuel cell applications. In some cases, the porous particles can undergo a structural transformation or chemical reaction in providing a new material that is microscopically homogeneous in composition. For example, heat treatment above 1100° C. of a pressed pellet of porous γ-alumina provides a porous α-alumina pellet. In another example, porous γ-alumina can react with a NaOH solution to form sodium aluminate after drying and heating.

The porous particles, composites, and materials described herein can be used in a variety of ways including, but not limited to, as adsorbents, absorbents, nanoreactors, nanoglues, nanocontainers, catalysts, catalyst supports, oxidizing agents, reducing agents, filters, chromatography media, transparent windows, permeable windows, membranes, gas/liquid/fuel storage materials, electrodes, sensors, bio-implants, structure reinforcing materials, solar energy collectors, supercapacitors, solar cell components, dielectrics, thermal insulators, paint thickeners, packaging materials, refractories, additives, ink jet coatings, porous binders, porous fillers, ionic conductors, bioreactors, active battery components, thermal composites (porous metal oxide impregnated with a phase change compound, for example), toxin removal, chemical removal, waste removal, hazard removal, chemical decontaminants, bioactive decontaminants, odor elimination, energetic materials, evaporative chillers/heaters, and drug delivery materials. In some cases, the porous composites or materials may be ground into powder. The powder can be subsequently shaped into consolidated forms, for example, by pressing. Additional heating may provide increased mechanical strength.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

$AlCl_3 \cdot 6H_2O$ (2.96 g, 12.3 mmol) was dissolved in 20 mL of a 50/50 v/v (volume/volume) mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of dimethyl sulfoxide (DMSO) for 4 days and were transferred into a bath of castor oil heated at 55° C. After soaking in the oil for 3 days, the gel was taken out of the bath and heated in an electrical Bunsen burner above 700° C. in air. A complete burning at the same temperature (over 700° C.) in a furnace over 10 hours then under oxygen for two hours resulted in a transparent γ-alumina. BET and BJH analysis showed that the alumina has a surface area of 288 $m^2/g$ and a pore volume of 2.06 cc/g (from pores less than 125 nm in diameter). The BET adsorption average pore diameter was 27.8 nm and the BJH adsorption average pore width was 28.6 nm. The alumina showed significant absorption of liquids such as acetone and water.

Figure 3:
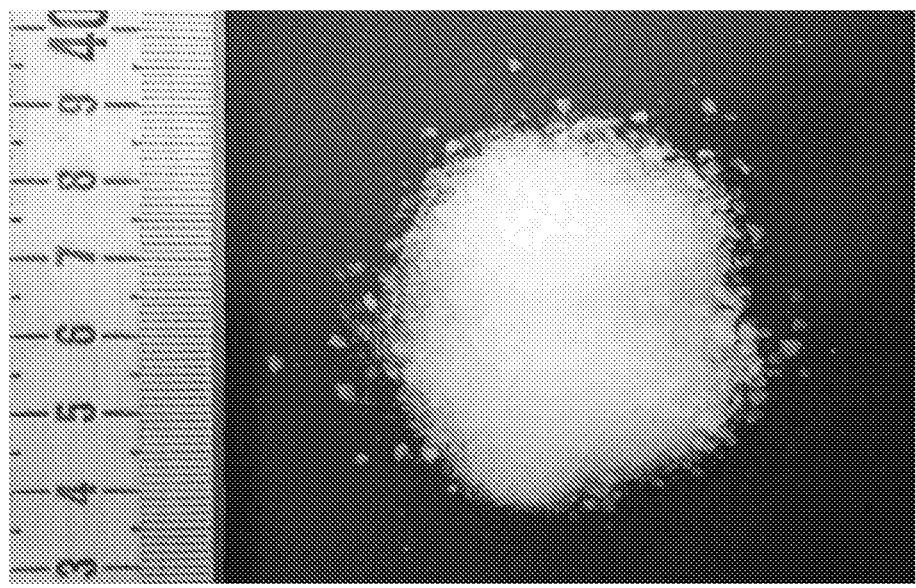
FIG. 3 is a photograph of porous alumina particles formed by the method described in Example 1.
Figure 4A:
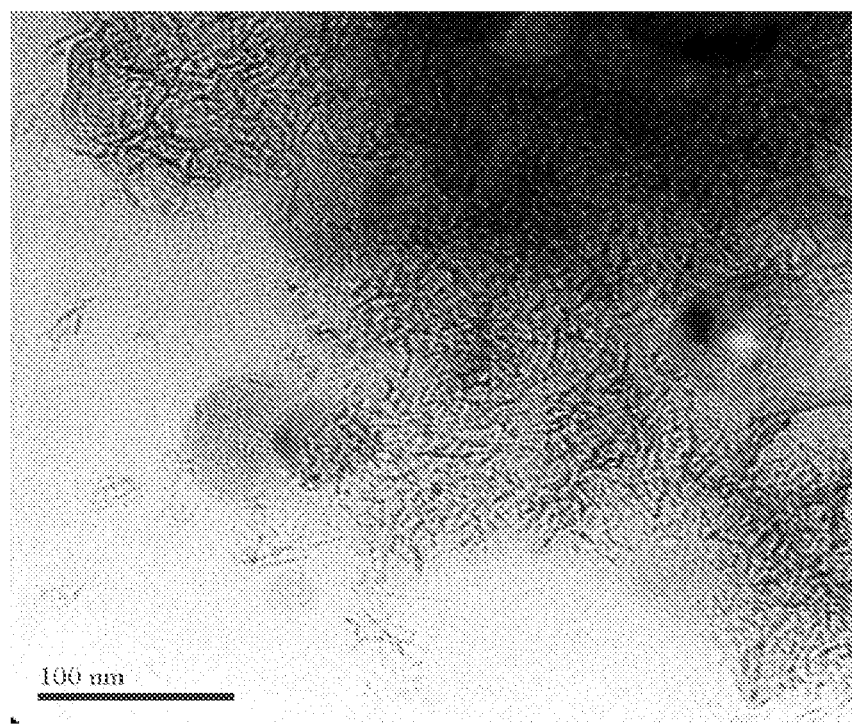
FIGS. 4A-4C are transmission electron micrographs of porous alumina particles formed by the method described in Example 1.
Figure 4B:
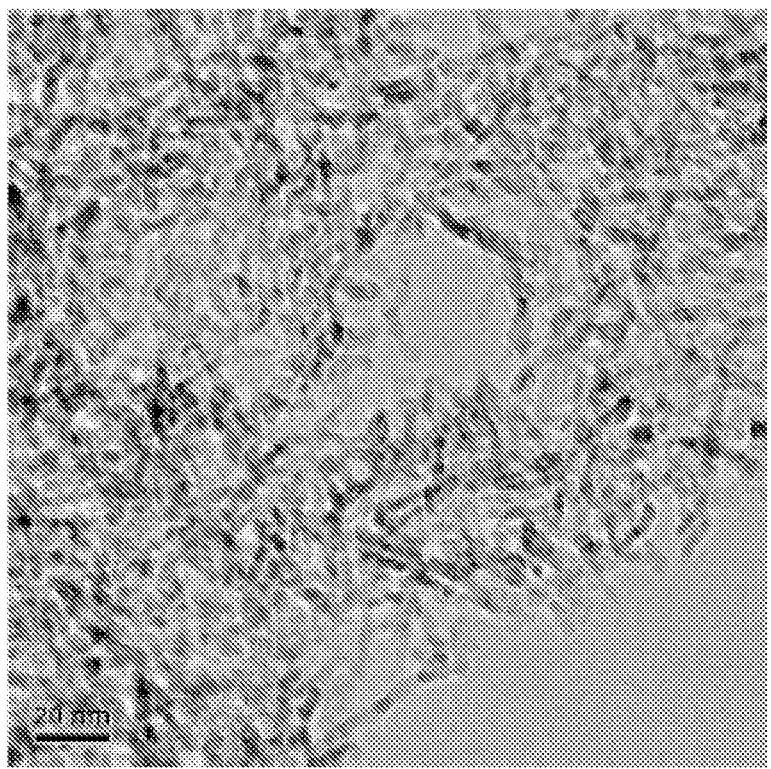
Figure 4C:
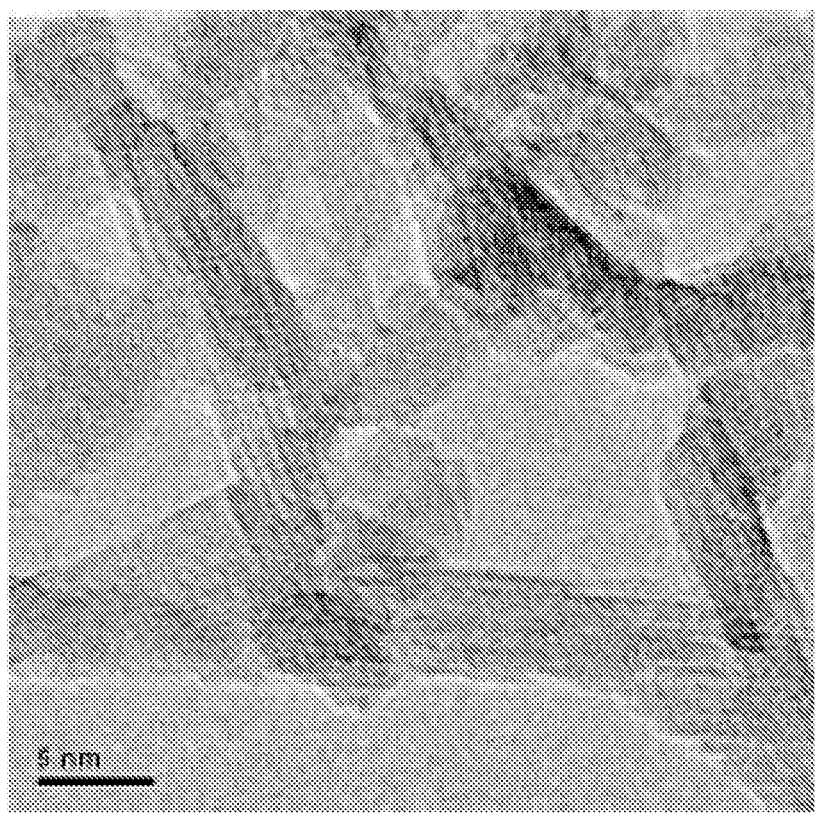
Figure 5:
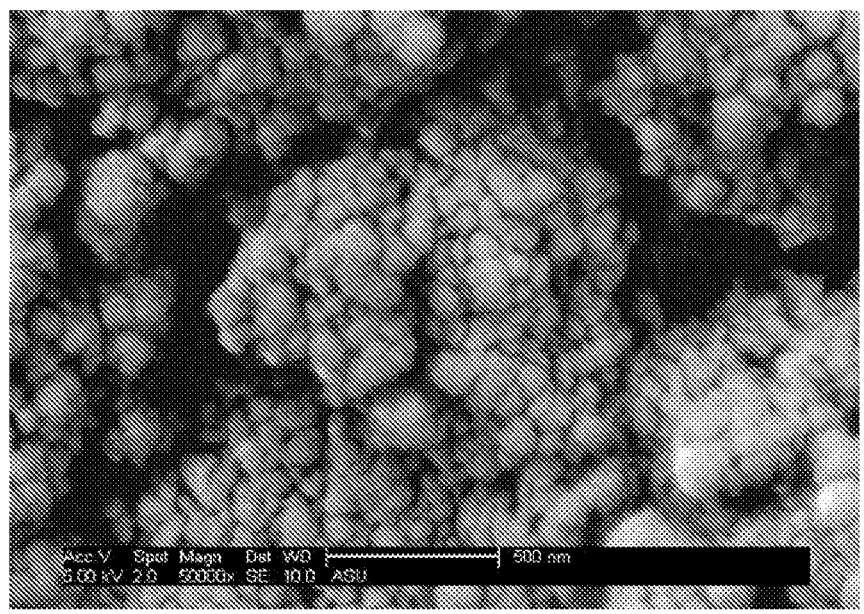
FIG. 5 is a scanning electron micrograph image of porous alumina particles formed by the method described in Example 1.
Figure 6:
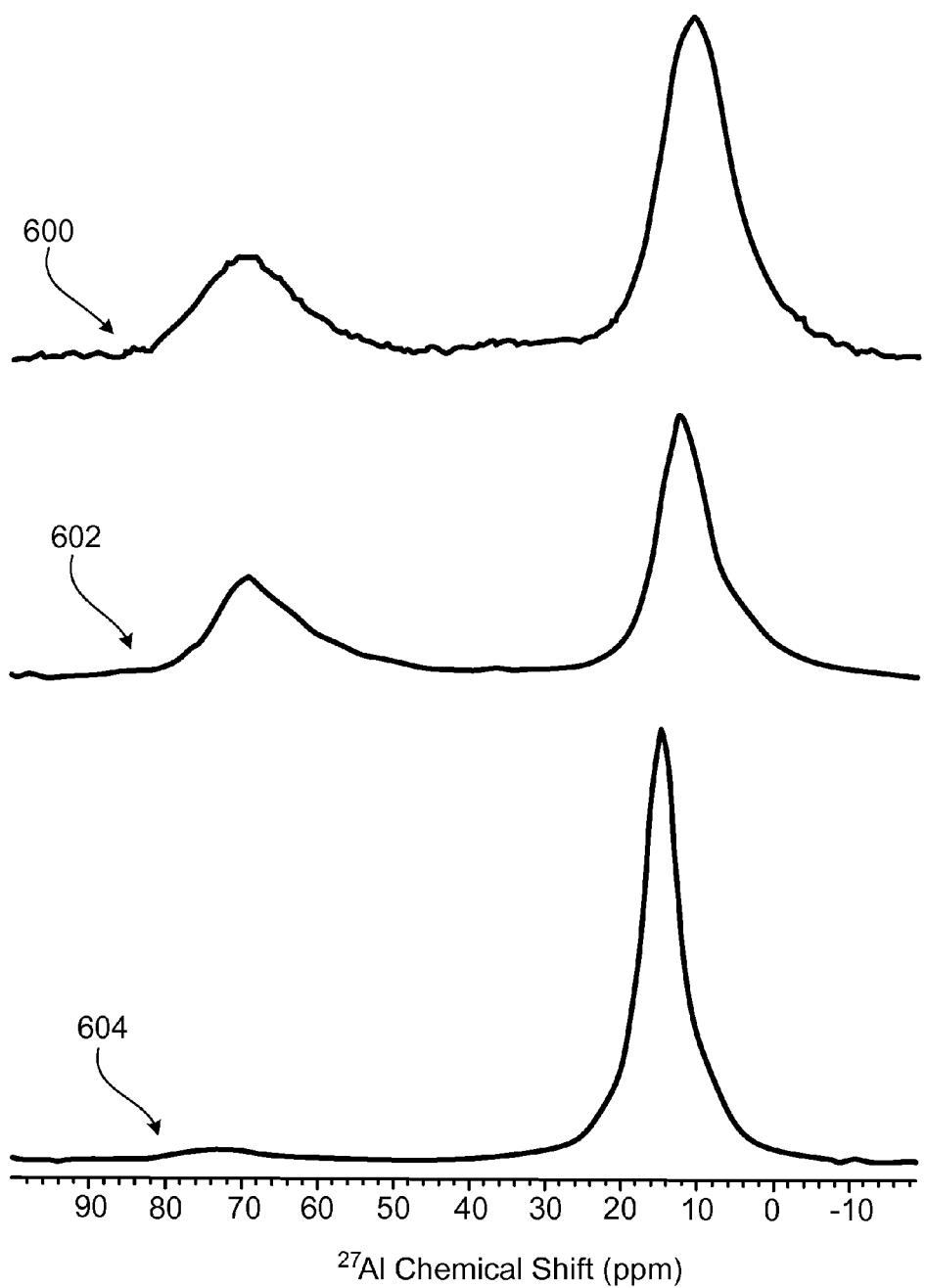
FIG. 6 shows $^{27}$Al NMR spectra of porous alumina particles formed by the method described in Example 1, along with γ-alumina and α-alumina.
Figure 7:
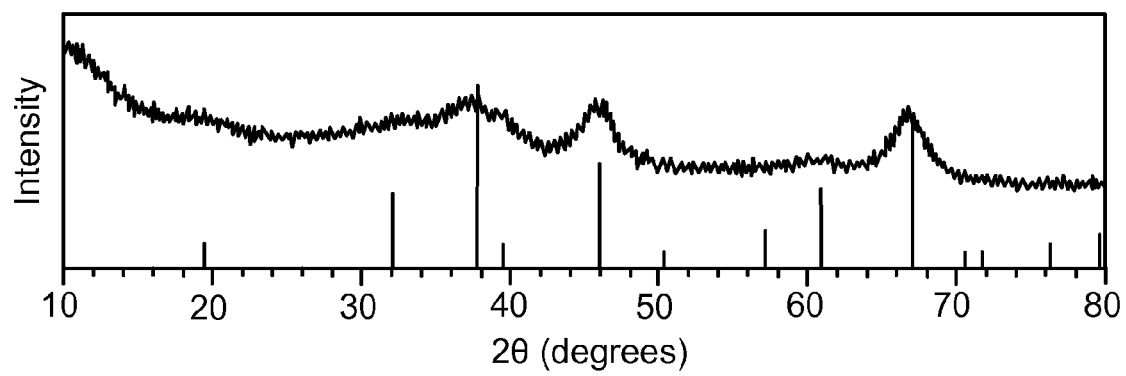
FIG. 7 is a powder X-ray diffraction pattern of porous alumina particles formed by the method described in Example 1.

FIG. 3 is a photograph of porous alumina particles formed by the method of Example 1. FIGS. 4A-4C are transmission electron microscope (TEM) images (various magnifications) of porous alumina particles formed by the method of Example 1, showing a porous particle with a range of pore sizes. FIG. 5 is a scanning electron microscope (SEM) image of porous alumina formed by the method of Example 1, showing a morphology of the particles. FIG. 6 shows a $^{27}Al$ NMR spectrum of porous alumina particles formed by the method described in Example 1 (plot 600), as well as $^{27}Al$ NMR spectra of γ-alumina (plot 602) and α-alumina (plot 604). The spectra indicate that porous alumina particles formed by the method described in Example 1 are substantially γ-alumina. FIG. 7 is a powder X-ray diffraction spectrum of porous alumina particles formed by the method described in Example 1, indicating the presence of γ-alumina.

Example 2

At one end of an evacuated silica tube (ID=10 mm, length about 20 cm), $Cu_3Sn$ alloy pieces (about 100 mg) were heated to 600° C. At the other end of the tube, alumina prepared as in Example 1 (about 100 mg) was heated at 700° C. with a small amount of iodine as a transport agent. Over nine days of chemical vapor transport (CVT) reaction, Cu—Sn nanoparticles were deposited in the pores of the alumina, as evidenced by discoloring of the alumina and TEM images. The doped alumina showed significant absorption of liquids such as acetone and water.

Example 3

About 20 mg of porous alumina particles prepared as in Example 1 was soaked in a saturated fructose solution for about 5 min. After drying off the water solvent, the soaked alumina was burned with an electrical Bunsen burner over 600° C. in a nitrogen gas flow. A black product resulted. The product showed a significant absorption of liquids such as acetone and water. TEM studies confirmed formation of crystalline carbon in the pores of the alumina.

Example 4

The black product formed in Example 3 was immersed in a stirred, concentrated NaOH aqueous solution for 3 days. The basic solution dissolved the alumina scaffold substantially to leave essentially only the carbonaceous material. The carbonaceous material absorbed solvents such as acetone and water.

Example 5

About 20 mg of porous alumina prepared as in Example 1 was soaked in a saturated $KMnO_4$ aqueous solution for 2 min and dried in an oven at 110° C. The material was a dark purple color, characteristic of $KMnO_4$. The material was heated in air at 270° C. for 3 hrs. A dark brown product resulted. The product was washed in water to remove the reaction by-products. The product showed a significant absorption of liquids such as acetone and water. The formation of manganese oxide nanoparticles in the pores of the alumina was confirmed by TEM studies.

Example 6

Porous alumina prepared as in Example 1 was soaked in a pink, aqueous solution of $CoCl_2$. The doped porous alumina was dried in an oven at 110° C. for about 10 minutes. After drying, the alumina was blue, indicating the presence of anhydrous $CoCl_2$. When the blue alumina was immersed in water, the color changed to pink, indicating water absorption.

Example 7

Porous alumina prepared as in Example 1 was immersed in a pH 8 Tris buffer solution of cytochrome C protein. After stirring for about 10 minutes, the solution became more clear while the porous alumina turned red, indicating adsorption of the protein molecule by the porous alumina. The cytochrome C-containing porous alumina was ground and pressed into a pellet under pressure at about 5000 psi to yield a red, translucent disc. The disc could readily absorb liquids such as acetone, hexane and water.

Example 8

About 200 mg of $Na_2K$ liquid alloy and about 200 mg of the porous alumina prepared as in Example 1 were placed in an evacuated PYREX® tube. The tube was sealed off and heated to 250° C. for several hours. The porous alumina/alloy composite turned black. Higher loading of the alloy in the porous alumina gave a dark gold color to the alumina.

Example 9

$AlCl_3.6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of DMSO for 4 days and were transferred into an oil bath of corn, vegetable, or canola oil. After soaking in oil for 3 days, the gel was taken out of the bath and heated in an electrical Bunsen burner above 700° C. in air. A complete burning at the same temperature in a furnace over 10 hrs resulted in transparent porous alumina.

Example 10

$AlCl_3.6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of DMSO for 4 days and were transferred into baths of waste vegetable oil. The waste vegetable oil was a 40/1 v/v mixture of soybean and olive oils generated from household frying of vegetables and animal meats for cooking purposes. After soaking in oil for 3 days, the gel was taken out of the bath and heated in an electrical Bunsen burner above 700° C. in air. A complete burning at the same temperature in a furnace over 10 hrs resulted in transparent porous alumina.

Example 11

$AlCl_3.6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of DMSO for 4 days and were transferred into baths of castor oil heated at 55° C. After being soaked in the oil for 3 days, the gel was taken out from the bath and heated in an electrical Bunsen burner above 700° C. with a lid on top of the sample container, yielding carbon-containing alumina, as evidenced by the black color of the alumina. Due to the limited flow of oxygen, the incomplete combustion of the castor oil afforded carbon residues on the surface and within the pores of the alumina. The BET and BJH analysis showed that the carbon-containing alumina had a surface area of 410 $m^2/g$ and a pore volume of 1.20 cc/g from the pores less than 125 nm. The adsorption average pore diameter was 11.5 nm and the adsorption average pore width was 10.3 nm.

Example 12

$AlCl_3.6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 1 day. The gel parts were then soaked in a bath of absolute ethanol where the bath was changed daily with fresh ethanol for 5 days. The gel parts were transferred into a bath of castor oil heated at about 95° C. above the boiling point of ethanol. After soaking in the oil for 2 days, the gel was taken out of the bath and heated in an electrical Bunsen burner above 700° C. in air. Burning off carbon residue at 700° C. yielded transparent γ-alumina particles that readily absorbed liquids such as acetone. In another example, THF was used rather than ethanol to produce transparent γ-alumina.

Example 13

$AlCl_3 \cdot 6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of tetrahydrofuran (THF) for 3 days and were transferred into baths of THF/castor oil mixtures of various v/v ratios. After soaking in the mixture for 1 day, the gels were taken out of the bath and heated in an oven at 70° C. for 6 hours, after which the gels were heated in an electrical Bunsen burner above 700° C. in air. A complete burning at the same temperature in a furnace over 10 hours resulted in transparent transition alumina. BET and BJH analysis of gels prepared from a 90/10 v/v THF/castor oil mixture showed that the resulting alumina was mesoporous with a surface area of 304 $m^2/g$ and a pore volume of 2.04 cc/g from the pores less than 125 nm. The adsorption average pore diameter was 26.8 nm and the adsorption average pore width was 25.2 nm.

Example 14

$AlCl_3 \cdot 6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of tetrahydrofuran (THF) for 3 days and were transferred into baths of THF/mineral oil mixtures of various v/v ratios. After soaking in the mixture for 1 day, the gels were taken out from the bath and heated in an oven at 70° C. for 6 hours, after which they were heated in a gas burner above 700° C. in air. A complete burning at the same temperature in a furnace over 10 hours resulted in transparent transition alumina.

Example 15

Porous carbon-containing silica was made by mixing 1.0 mL of sodium silicate water glass solution (27% $SiO_2$) with 4.0 mL of water and then adding 6.9 mL of 0.7 M acetic acid. The reaction mixture was stirred and then the solutions were allowed to age at room temperature for 4 days. The gel parts were soaked in a bath of THF for 2 days and were transferred into a bath of 80/20 v/v THF/castor oil mixture for 1 day. The gel parts were taken out of the bath and heated in an oven at 70° C. for 6 hours, after which they were heated in an electrical Bunsen burner above 700° C. in air. A complete burning at the same temperature in a furnace over 10 hours resulted in black, carbon-containing porous silica. A powder X-ray diffraction pattern shows that the material is amorphous.

Example 16

$ZrCl_4$ (1.17 g, 5 mmol) and $YCl_3 \cdot 6H_2O$ (0.30 g, 1 mmol) were dissolved in 10 mL of water to form a clear solution. Propylene oxide (3.2 g, 55 mmol) was then added to the clear solution. The reaction mixture was stirred, transferred to plastic molds, and the solutions were allowed to gel at room temperature for 1 day. The gel parts were then soaked in a bath of THF for 3 days and were transferred into baths of mixtures of THF/polymerized castor oil of various v/v ratios. The castor oil was thermally polymerized beforehand by heating at 350° C. for 3 hours to give a liquid more viscous than the original castor oil. After soaking in the mixture for 1 day, the gel was taken out of the bath and heated in a gas burner above 700° C. in air. A complete burning at the same temperature in a furnace over 10 hours resulted in opaque yttria-stabilized zirconia (YSZ). The BET and BJH analysis showed that the YSZ had a surface area of 65 $m^2/g$ and the pore volume of 0.35 cc/g from the pores less than 125 nm. The adsorption average pore diameter was 20.7 nm and the adsorption average pore width was 19.0 nm.

Example 17

Alumina gel was prepared by dissolving 2.2 g of gibbsite $(Al(OH)_3)$ in 10 g water with 7 g of concentrated HCl. After the solution was clear, 5 g of urea $((NH_2)_2CO)$ was added and the mixture was placed in an oven at 85° C. After 24 hours, the mixture formed a hard translucent gel.

Example 18

Alumina gel was prepared by dissolving 2.2 g of gibbsite $(Al(OH)_3)$ in 10 g of water with 6 g of concentrated HCl. After the solution was clear, 4.5 g of concentrated $NH_4OH$ was added, followed by 4 g of urea. The mixture was placed in an oven at 85° C. After 48 hours, the mixture formed a hard translucent gel.

Example 19

$AlCl_3 \cdot 6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred, transferred to plastic molds, and the solutions were allowed to gel at room temperature for 3 days. The gel parts were then soaked in a bath of THF for 3 days and subsequently transferred into baths of THF/castor oil/silicon oil (poly-dimethylsiloxane) of various v/v/v ratios. After soaking in the mixture for 1 day, the gel parts were taken out from the bath and heated in an oven at 70° C. for 6 hours, after which they were heated in a gas burner above 700° C. in air. The product was divided into two portions. One portion was heated at 700° C. over 10 hours, which resulted in transparent transition alumina. The other portion was heated to 1100° C. over 10 hrs. The BET and BJH analysis of gels prepared from a 90/5/5 volume ratio of THF/castor oil/silicon oil mixture and heat-treated at 1100° C. showed that the resulting alumina was mesoporous, with a surface area of 199 $m^2/g$ and a pore volume of 1.0 cc/g from the pores less than 125 nm. The adsorption average pore diameter was 19.7 nm and the adsorption average pore width was 16.3 nm. The powder X-ray diffraction pattern shows that the product is silicon-doped γ-alumina.

Example 20

About 50 mg of ferredoxin was dissolved in 4 mL of a pH 7.7 aqueous buffer solution of 20 mM HEPES buffer and 100 mM NaCl. Approximately 1 mL of this solution was added to about 100 mg of porous alumina particles prepared as described in Example 1. UV-Visible spectra of the supernatant solution over the porous alumina were collected several times over the course of 3 days. These spectra showed a significant reduction of the absorbance of characteristic peaks of ferredoxin over time, as compared with a control. A visible color change of the porous alumina particles from colorless to yellow was also apparent, indicating adsorption of ferredoxin into the porous alumina.

Example 21

$AlCl_3 \cdot 6H_2O$ (2.96 g, 12.3 mmol) was dissolved in 20 mL of a 50/50 v/v mixture of water and ethanol to form a clear solution. Propylene oxide (7.86 g, 135 mmol) was then added to the clear solution. The reaction mixture was stirred and transferred to plastic molds, and the solutions were allowed to gel at room temperature for 3 days. The gel parts were then soaked in a bath of DMSO for 4 days and were transferred into baths of castor oil heated at 55° C. After soaking in the oil for 3 days, the gel parts were taken out from the bath and heated up to 350° C. for 3 hours to polymerize the castor oil in the pores of gel. The gel parts were then heated in an electrical Bunsen burner above 700° C. in air. A complete burning at the same temperature in a furnace over 10 hours yielded porous semi-transparent alumina particles.

Example 22

$AlCl_3 \cdot 6H_2O$ (2.96 g, 12.3 mmol) was dissolved in 20 mL of a 50/50 v/v mixture of water and ethanol to form a clear solution. Tetraethylorthosilicate (TEOS) (0.94 g, 4.5 mmol) and propylene oxide (7.86 g, 135 mmol) were then added to the clear solution. The reaction mixture was stirred and transferred to plastic molds, and the solutions were allowed to gel at room temperature for 3 days. The gel parts were then soaked in a bath of DMSO for 4 days and were transferred into baths of castor oil heated at 55° C. After soaking in the oil for 3 days, the gel was taken out of the bath and heated in an electrical Bunsen burner above 700° C. in air to yield transparent, silicon-doped porous alumina.

Example 23

Porous alumina prepared as described in Example 1 was placed in a 1:9:40 v/v/v solution of $TEOS:H_2O:EtOH$ for 1 hour, then allowed to air dry overnight. The impregnated alumina pieces were then heated to 1100° C. for 10 hours, resulting in transparent silicon-doped γ-alumina. BET and BJH analyses showed that the doped γ-alumina had a surface area of 163 $m^2/g$ and a pore volume of 0.92 cc/g. The adsorption average pore diameter was 38 nm.

Example 24

Porous γ-alumina prepared as described in Example 1 was soaked in a solution of neodymium nitrate hexahydrate (1.814 g in 6 mL of water) for 1 hour then allowed to air dry at room temperature over night. The impregnated alumina pieces were then heated to 1100° C. for 10 hours, resulting semi-transparent porous $NdAlO_3$. BET and BJH analysis showed that the porous $NdAlO_3$ had a surface area of 47.6 $m^2/g$ and pore volume of 0.40 cc/g. The adsorption average pore diameter was 34.6 nm.

Example 25

50 mg of $TiCl_4$ was dissolved in 1.5 g of dichloromethane in a nitrogen atmosphere. 250 mg of this solution was mixed with 50 mg of porous alumina pieces prepared as described in Example 1. The pieces were then exposed to air, rinsed with hexane and heated to 600° C. for a few hours. The product showed significant absorption of liquids such as acetone and water. Powder X-ray diffraction of the titania-alumina composite showed evidence of rutile $TiO_2$.

Example 26

About 75 mg of porous alumina prepared as described in Example 1 was soaked in a solution of 200 mg cuprous iodide (white color) dissolved in a saturated potassium iodide aqueous solution. A large volume of water was added to the solution, resulting in the precipitation of CuI within the porous alumina. The porous alumina pieces were then washed with water, then with acetone, and air dried. The product showed significant absorption of liquids such as acetone and water. The dried pieces were transparent and green. After heating to 400° C. for an hour in oxygen, the dried pieces were transparent and grey-blue, indicating the presence of copper ions coordinated by oxide anions. The powder X-ray diffraction pattern showed that the product remained in the γ-alumina structure.

Example 27

A porous alumina pellet was formed from porous alumina prepared as described in Example 1. The pellet was soaked in a solution of 0.52 g of 37% (w/w) formaldehyde, 0.34 g of resorcinol, and 9 g of acetonitrile. (See Mulik, S., Sotiriou-Leventis, C. and Leventis, N. "Time-Efficient Acid-Catalyzed Synthesis of Resorcinol-Formaldehyde Aerogels". *Chemistry of Materials* 2007, 19, 6138-6144) A solution of 0.5 g of acetonitrile and 1 drop of concentrated HCl was prepared and mixed with the formaldehyde solution. This mixture with the pellet was placed in an oven at 80° C. for 10 minutes until a gel formed. Excess gel was removed from the pellet and the pellet was soaked in acetone, followed by soaking in hexanes, followed by air drying. The dried pellet was then heated in argon gas to 800° C. for 3 hours to produce a carbon/alumina composite pellet. The product showed significant absorption of liquids such as acetone and water. The carbon-alumina composite showed an electrical conductance higher than that of the original alumina. TEM and SEM studies confirmed the presence of carbon as well as a porous structure.

Example 28

Epoxy components 305A and 305B from Epoxy Technology (Billerica, Mass.) were mixed together in about a 1:1 volume ratio. Porous alumina pieces prepared according to Example 1 were mixed together with the epoxy components. This mixture was then spread on glass slides and paper and placed in an oven at 80° C. After approximately 24 hours, the mixtures had cured into hard coatings. The epoxy/alumina composite coatings were shown to be more resistant to scratching and cutting than epoxy coatings without porous alumina particles.

Example 29

Porous γ-alumina pellets were prepared from by grinding porous alumina prepared according to Example 1 into a powder with a mortar and pestle for 30 minutes. This powder was then placed in a pelletizer and compressed at about 5000 psi. (See Richards et al., "Consolidation of Metal Oxide Nanocrystals. Reactive Pellets with Controllable Pore Structure That Represent a New Family of Porous, Inorganic Materials." *Journal of the American Chemical Society* 2000, 122, 4921-4925.) The product showed significant absorption of liquids such as acetone and water. The pellets were then heated at 1100° C. for 10 hours to improve the mechanical strength of the pellets. A powder X-ray diffraction pattern showed that the material had converted from γ- to α-alumina.

While this document contains many specifics, these should not be construed as limitations on the scope of any invention or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Variations, modification, enhancements of the described embodiments and other embodiments can be made based on what is described and illustrated.

What is claimed is:

1. A method comprising:
   contacting a gel comprising a first liquid and an oxygen-containing compound of a metal, semi-metal, metalloid, or semi-conductor with a combustible liquid to form a combustible gel; and
   initiating combustion of the combustible gel to form a substance comprising porous particles, the porous particles comprising porous metal oxide particles, porous semi-metal oxide particles, porous metalloid oxide particles, or porous semi-conductor oxide particles.

2. The method of claim 1, wherein the oxygen-containing compound is an oxide, hydroxide, alkoxide, oxohydroxide, oxoalkoxide, oxo salt, or oxo salt hydrate of the metal, semi-metal, metalloid, or semi-conductor.

3. The method of claim 1, wherein the porous particles comprise alumina.

4. The method of claim 1, wherein contacting the gel with the combustible liquid comprises soaking the gel in the combustible liquid.

5. The method of claim 1, wherein the substance further comprises carbon.

6. The method of claim 5, further comprising treating the substance to remove carbon from the substance.

7. The method of claim 1, wherein the combustible liquid is more viscous than the first liquid at room temperature.

8. The method of claim 1, wherein the combustible liquid comprises a volatile solvent.

9. The method of claim 8, wherein the volatile solvent comprises tetrahydrofuran, dimethyl sulfoxide, or ethanol.

10. The method of claim 1, wherein the combustible liquid comprises an oil or a compound derived from an oil.

11. The method of claim 10, wherein the oil comprises oil derived from a geological, agricultural, or aquacultural source.

12. The method of claim 10, wherein the oil comprises an industrial waste product or by-product, or household waste product.

13. The method of claim 1, further comprising heating the combustible gel before initiating combustion.

14. The method of claim 1, further comprising contacting the gel with a second liquid before contacting the gel with the combustible liquid.

15. The method of claim 1, further comprising contacting the porous particles with an additive to form a composite comprising the porous particles and the additive.

16. The method of claim 15, further comprising contacting the composite with a solvent to etch the composite.

17. The method of claim 1, wherein the porous particles are nanoporous.

18. The method of claim 1, further comprising treating the porous particles to form a material.

* * * * *